United States Patent
Hélot et al.

(10) Patent No.: US 11,554,670 B2
(45) Date of Patent: Jan. 17, 2023

(54) DISPLAY ADJUSTMENT SYSTEM AND METHOD FOR POSITIONING A DISPLAY FOR A DASHBOARD OF A VEHICLE

(71) Applicant: AUDI AG, Ingolstadt (DE)

(72) Inventors: Jacques Hélot, Ingolstadt (DE); Yunzhou Wu, Beijing (CN)

(73) Assignee: AUDI AG, Ingolstadt (DE)

( * ) Notice: Subject to any disclaimer, the term of this patent is extended or adjusted under 35 U.S.C. 154(b) by 264 days.

(21) Appl. No.: 16/768,280

(22) PCT Filed: Nov. 30, 2018

(86) PCT No.: PCT/EP2018/083074
§ 371 (c)(1),
(2) Date: May 29, 2020

(87) PCT Pub. No.: WO2019/106119
PCT Pub. Date: Jun. 6, 2019

(65) Prior Publication Data
US 2021/0178899 A1    Jun. 17, 2021

(30) Foreign Application Priority Data
Dec. 1, 2017    (DE) .................. 10 2017 221 711.1

(51) Int. Cl.
*B60R 11/02*    (2006.01)
*B60K 37/02*    (2006.01)
*B60R 11/00*    (2006.01)

(52) U.S. Cl.
CPC .......... *B60K 37/02* (2013.01); *B60R 11/0235* (2013.01); *B60K 2370/67* (2019.05); *B60R 2011/0005* (2013.01)

(58) Field of Classification Search
CPC .... B60K 37/02; B60K 2370/67; B60K 37/04; B60K 35/00; B60R 11/0235;
(Continued)

(56) References Cited

U.S. PATENT DOCUMENTS 6,570,628 B1    5/2003 Hirano
9,346,414 B1 *  5/2016 Kuhens ............... B60R 11/0258
(Continued)

FOREIGN PATENT DOCUMENTS

DE          10332586 B3    3/2005
DE    10 2011 000 924 A1  8/2012
(Continued)

OTHER PUBLICATIONS

International Provisional Report on Patentability (Forms PCT/IPEA/409, PCT/IPEA/416) dated Feb. 20, 2020 in International Patent Application No. PCT/EP2018/083074.
(Continued)

*Primary Examiner* — Dennis H Pedder
(74) *Attorney, Agent, or Firm* — Staas & Halsey LLP

(57) ABSTRACT

A display and an adjustment device are included in a display adjustment system for an instrument panel of a vehicle. The adjustment device adjusts the display from an original position in the instrument panel into a central position in a passenger compartment of the vehicle. The adjustment device moves the display from the original position of the display in the instrument panel along a central longitudinal axis of the vehicle in the direction of a rear part of the vehicle and transversely with respect to the longitudinal central axis of the vehicle in the direction of a driver's seat so that the display is adjusted into the central position in the passenger compartment of the vehicle.

19 Claims, 3 Drawing Sheets

(58) Field of Classification Search
CPC ....... B60R 2011/005; B60R 2011/0084; B60R 2011/00085; B60R 2011/0092
USPC .......................................... 296/70; 248/27.1
See application file for complete search history.

(56) References Cited

U.S. PATENT DOCUMENTS

| | | | |
|---|---|---|---|
| 9,434,255 B2* | 9/2016 | Bendewald | B60K 35/00 |
| 10,023,091 B2* | 7/2018 | Bendewald | B60N 3/001 |
| 2017/0101032 A1* | 4/2017 | Sugioka | B60N 2/0881 |

FOREIGN PATENT DOCUMENTS

| | | | | |
|---|---|---|---|---|
| DE | 20 2013 010582 U1 | 2/2014 | | |
| DE | 10 2014 202 528 A1 | 8/2015 | | |
| DE | 20 2015 103992 U1 | 11/2015 | | |
| DE | 10 2014 016 222 A1 | 5/2016 | | |
| DE | 10 2015 011 614 A1 | 3/2017 | | |
| DE | 10 2016 011461 A1 | 4/2017 | | |
| DE | 10 2015 226586 A1 | 6/2017 | | |
| DE | 102016207042 A1 * | 10/2017 | | |
| DE | 102017221711.1 | 12/2017 | | |
| EP | 1298003 A1 | 4/2003 | | |
| EP | 1671845 A1 | 6/2006 | | |
| FR | 2 896 194 | 7/2007 | | |
| WO | WO-0065836 A1 * | 11/2000 | ......... | B60R 11/0235 |
| WO | PCT/EP2018/083074 | 11/2018 | | |

OTHER PUBLICATIONS

International Search Report (Forms PCT/ISA/210, PCT/ISA/220) dated Mar. 21, 2019 in International Patent Application No. PCT/EP2018/083074.

* cited by examiner

DISPLAY ADJUSTMENT SYSTEM AND METHOD FOR POSITIONING A DISPLAY FOR A DASHBOARD OF A VEHICLE

CROSS-REFERENCE TO RELATED APPLICATIONS

This application is a U.S. national stage of International Application No. PCT/EP2018/083074, filed on Nov. 30, 2018. The International Application claims the priority benefit of German Application No. 10 2017 221 711.1 filed on Dec. 1, 2017. International Application No. PCT/EP2018/083074 and German Application No. 10 2017 221 711.1 are incorporated by reference herein in their entirety.

BACKGROUND

Described herein is a display adjustment system for an instrument panel of a vehicle and to a method for positioning the display.

In vehicles it is customary to place displays/screens in an instrument panel/a dashboard of the vehicle in order to permit a vehicle occupant to access media or applications. As an example, such a display/such a screen is arranged in the instrument panel of the vehicle in such a way that a vehicle occupant, for example a vehicle driver, can access the display or the screen, which is often embodied as a touchscreen, during manual travel.

German Patent Application No. 10 332 586 B3 describes a center console for accommodating electrical devices and switching elements. The center console includes here a display for displaying information of a navigation system, wherein the display can be adjusted in its position in the direction of a driver.

German Patent Application No. 10 2011 000 924 A1 describes an arrangement of a display input unit in a vehicle. The display input unit is mounted so as to be displaceable transversely with respect to a longitudinal direction of the vehicle.

German Patent Application No. 10 2014 016 222 A1 describes a method and a system for operating a touch-sensitive display device of a motor vehicle.

SUMMARY

In the related art, devices and methods for positioning a display in an instrument panel are therefore known. However, such devices and methods do not take into account the fact that different requirements are made with respect to a position of a display in the case of manual travel and in the case of piloted travel. In the case of manual travel, owing to the steering wheel which is present and is required for manual control, the display is positioned in such a way that it points from a center of the instrument panel in the direction of a front seat passenger side of the vehicle. In the case of a changeover from manual travel to piloted travel, in which the steering wheel is generally not required and can be eliminated/or folded in, a changeover of the sitting position of the vehicle occupants also often occurs. For example, in the case of a change from manual travel to piloted travel a seat of the vehicle driver is therefore often automatically moved rearward and the backrest of the seat is inclined backward automatically or at the vehicle occupant's request. As a result, the sitting position of the vehicle driver in the vehicle changes, which impedes access to the display arranged in the instrument panel.

Therefore, described herein are a device and a method with which access to a display and visibility of the display in the instrument panel of the vehicle can be improved during piloted travel.

The subject matter disclosed herein includes a display adjustment system for an instrument panel in a vehicle, including a display and an adjustment device.

According to the disclosure, the adjustment device is configured to adjust or move the display from an original position in the instrument panel of the vehicle into a central position in a passenger compartment of the vehicle. As an example, the adjustment device is embodied as at least one articulated arm. The adjustment device is arranged or attached in the instrument panel, wherein a first end of the at least one articulated arm is connected to the instrument panel, and a second end of the at least one articulated arm is connected to the display. The at least one articulated arm in the instrument panel is for example connected to the instrument panel via a rotary joint here. The adjustment device which is arranged in such a way makes it possible for the display which is arranged in the instrument panel to be adjusted or moved from an original position of the display, arranged in the instrument panel, into a central position, in which it is contact free/released from the instrument panel, in the passenger compartment of the vehicle. A central position is a position which is formed centrally between the front seats of the vehicle and is therefore at the same time easily accessible both for a vehicle driver and for a front seat passenger of the vehicle. As an example, the at least one articulated arm is configured in an extendable fashion. The adjustment device can for example, advantageously have at least two articulated arms. This provides the advantage that a display which is embodied in an elongated fashion can be adjusted in a stable fashion into a new position.

In one refinement, the adjustment device is configured to adjust the display along a central longitudinal axis of the vehicle and transversely with respect to the central longitudinal axis of the vehicle. As an example, the at least one articulated arm of the adjustment device is configured in extendable fashion, as a result of which the display which is arranged on the articulated arm can be adjusted along the central longitudinal axis of the vehicle. As a result, the display can be moved closer to the vehicle occupants. The at least one articulated arm has, for example, a rotary joint, as a result of which the display which is arranged on the articulated arm can be adjusted transversely with respect to the central longitudinal axis. The adjustment device which is configured in such a way permits the central positioning of the display in the passenger compartment of the vehicle.

In a further refinement, the display adjustment system is configured to adjust the position of the display automatically in the case of piloted travel of the vehicle. This provides the advantage that the display adjustment system can meet the requirements which are made of a position of a display in the case of piloted travel. In the case of piloted travel, the vehicle seats of the vehicles occupants are often shifted rearward and the backrests of the vehicle seats are inclined rearward in the direction of the rear part of the vehicle. By use of the display adjustment system described herein, the display can be adjusted from the original position in the instrument panel, which is disadvantageous for piloted travel, into a central position in the passenger compartment of the vehicle, as a result of which a vehicle occupant, for example the vehicle driver or the front seat passenger, receives improved access to and an improved view of the display.

In one development, the adjustment device is configured to adjust, in the case of a changeover from manual travel of the vehicle to piloted travel of the vehicle, the display automatically or manually by the vehicle occupant from the original position in the instrument panel into the central position in the passenger compartment of the vehicle. Automatic positioning of the display is particularly comfortable for the vehicle occupant, since the display can be adjusted automatically, without the involvement of the vehicle occupant, into a position in which the vehicle occupant can readily access the display.

The changeover from manual travel to piloted travel is optionally carried out actively by the vehicle occupant/the vehicle driver. In this context, the adjustment system is configured to adjust the display into a central position in the case of a changeover from manual travel to piloted travel. In order to be able to adjust the display into a central position, the steering wheel is firstly moved into a position which is advantageous for piloted travel. A position which is advantageous for piloted travel is here a position in which the vehicle driver is provided with more space. This is generally the case if the steering wheel is moved forward in the direction of the instrument panel, folded in or taken off. In order to carry out the changeover from manual travel to piloted travel by the vehicle occupant or the vehicle driver, a signal in the form of gestures, touching the display which is for example embodied as a touch display, activating an input key or a voice command is sent to the vehicle. If such a signal of the vehicle occupant is sent to the vehicle or to the display adjustment system, the steering wheel is moved into a position which is advantageous for piloted travel. The display adjustment system is configured to adjust or move the display into a central position as soon as the steering wheel is in a position which is advantageous for piloted travel. The positioning of the display by the display adjustment system can be carried out automatically or be executed manually by a vehicle occupant. In one refinement, a display area of the display can be extended.

The display area of the display can for example be extended with a further display area, with the result that the display area of the display is increased overall. As an example, the at least one further display area is arranged on the display by use of a folding device. The folding device is for example embodied as a hinge. The display area of the display and the further display area are embodied as pixel areas, wherein when the display area of the display is extended with the further display area the pixel areas of the display area of the display and of the further display area are arranged lying one next to the other. In the case of manual travel, the folding device is typically folded in. In this context, the at least one further display area is folded in in such a way that it is arranged for example horizontally at an angle of approximately 90° from a rear side of the display area of the display which points in the direction of the instrument panel.

As an example, the at least one further display area is therefore concealed in the instrument panel of the vehicle by use of the folding device during manual travel. The at least one further display area is held here in the folded-in state by a housing of the instrument panel, or prevented from folding open. In the case of piloted travel, the display is adjusted along the central longitudinal axis of the vehicle, as a result of which a distance of the display from the instrument panel is increased. Increasing the distance between the display and the instrument panel also increases the distance between the folded-in display area and the housing of the instrument panel, and ultimately in a contactless fashion, as a result of which the folding device is triggered and the at least one further display area is folded open, as a result of which the display area of the display is increased overall.

The subject matter of the disclosure also includes a method for positioning a display in a vehicle including a display adjustment system as described above.

According to the disclosure, in a first operation the adjustment device positions the display starting from the original position of the display in the instrument panel along the central longitudinal axis of the vehicle in the direction of a rear part of the vehicle. As a result of the positioning of the display along the central longitudinal axis of the vehicle, the display is moved closer to the vehicle occupant, for example the vehicle driver or the front seat passenger. The distance between the display and the vehicle occupant is also reduced, as a result of which in the case of piloted travel with a rearward-inclined sitting of the vehicle occupant's upper body access to the display is made easier for the vehicle occupant.

In a further operation, the adjustment device positions the display transversely with respect to the central longitudinal axis of the vehicle in the direction of a driver's seat of the vehicle, and as a result the display is adjusted or moved into the central position in the passenger compartment of the vehicle. The further operation can be executed at the same time as or subsequent to the first operation. In the case of piloted travel, a steering wheel in the vehicle is not absolutely necessary, as a result of which the steering wheel can be folded in or eliminated and the previous space which was required for the steering wheel is available for use. The display can then be moved into a central position of the passenger compartment of the vehicle by positioning the display transversely with respect to the central longitudinal axis of the vehicle in the direction of the driver's seat. The centrally positioned display can project here into a region which was previously taken up by the now eliminated steering wheel. In the case of a changeover from manual travel to piloted travel, the steering wheel can, for example, be shifted forward in the direction of the instrument panel, with the result that the display can be positioned. The steering wheel can also be shifted so far forward in the direction of the instrument panel that the steering wheel is docked onto or arranged on the instrument panel. The steering wheel can alternatively also be taken off or folded in.

The method described herein provides the advantage that the display in the vehicle can be adjusted in such a way that the adjusted position can meet the requirements which are made of a position of the display in the case of piloted travel. By use of the method described herein, the display can therefore be adjusted from the original position in the instrument panel, which is disadvantageous in the case of piloted travel, into a central position in the passenger compartment of the vehicle. As a result, the vehicle occupant, for example the vehicle driver or the front seat passenger, can more easily access the display.

In one refinement, the method is executed in the case of piloted travel of the vehicle or in the case of a changeover from manual travel of the vehicle to piloted travel of the vehicle. For example, in the case of vehicles which can be guided both manually and in a piloted fashion, it is advantageous if the method is executed automatically in the case of a changeover from manual travel of the vehicle to piloted travel of the vehicle. This provides the vehicle occupant with a particularly high level of comfort since there is no need for any action on the part of the vehicle occupant to adjust the display into a central position which is advantageous for piloted travel. Alternatively, the adjustment can be carried out actively by an input, for example a voice command or a key input.

In one development of the method, a display area of the display is extended. As a result, the display area of the display is automatically extended with the positioning of the display along the central longitudinal axis of the vehicle. As a result of the positioning of the display along the central longitudinal axis of the vehicle, a relatively large distance is formed between the display and the instrument panel, as a result of which the at least one further display area becomes contactless with respect to the instrument panel, as a result of which the at least one further display area is triggered by use of the folding device and the display area of the display is made larger.

In one refinement, when piloted travel of the vehicle ends, the display is moved back into the original position in the instrument panel from the central position in the interior of the vehicle by the adjustment device. In the case of a vehicle which can be guided both manually and in a piloted fashion, the display is particularly advantageously shifted back from the central position in the passenger compartment of the vehicle into the original position in the display panel by the adjustment device. Generally in this case the steering wheel is made available again for manually guiding the vehicle.

The subject matter of the disclosure also includes a vehicle including a display adjustment system which is described herein.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

Figure 1A:
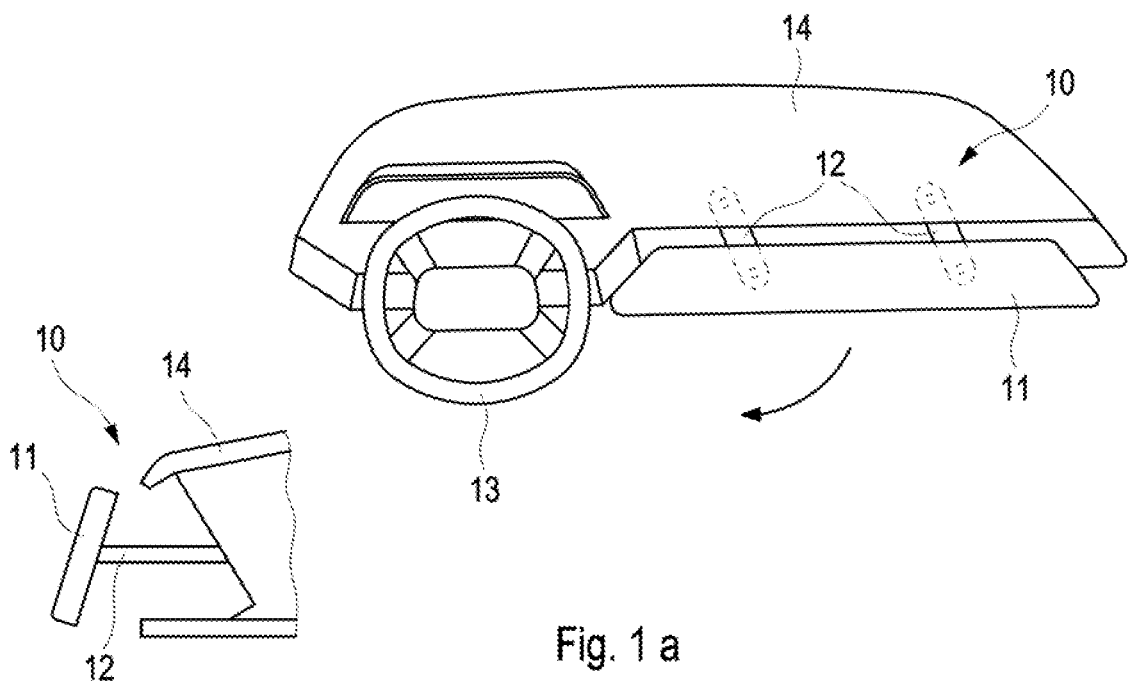
FIG. 1a is a schematic plan view and side view of an example embodiment of the display adjustment system in the case of a changeover from manual travel to piloted travel.

In the drawings, elements having the same function are each provided with the same reference signs.

FIG. 1a shows a schematic plan view and side view of an embodiment of the display adjustment system 10 in the case of a changeover from manual travel to piloted travel. In this context, an instrument panel 14 of a vehicle (not shown) is shown with a steering wheel 13. On one side of the steering wheel 13, which points in the direction of a front seat passenger's side of the vehicle (not shown), the display adjustment system 10 with a display 11 and an adjustment device 12 for adjusting a position of the display 11 extends starting from the center of the instrument panel 14 in the direction of the front seat passenger's side, in a passenger compartment of the vehicle (not shown). The adjustment device 12 is configured to adjust the display 11 in its position in the passenger compartment of the vehicle in the case of a changeover from manual travel to piloted travel. In this context, the adjustment device 12 is configured in such a way that it shifts the display 11 along a central longitudinal axis of the vehicle (not shown) into the passenger compartment of the vehicle (not shown). The adjustment device 12 is configured to adjust the display 11 transversely with respect to the longitudinal axis of the vehicle (not shown) into a central position starting from the position of the display 11 in which it is shifted into the passenger compartment. The positioning of the display 11 along the central longitudinal axis and transversely with respect to the central longitudinal axis of the vehicle (not shown) can take place simultaneously or successively. In the case of the changeover from manual travel to piloted travel, the positioning of the display 11 for example takes place at the same time as adjustment or folding in of the steering wheel 13.

Figure 1B:
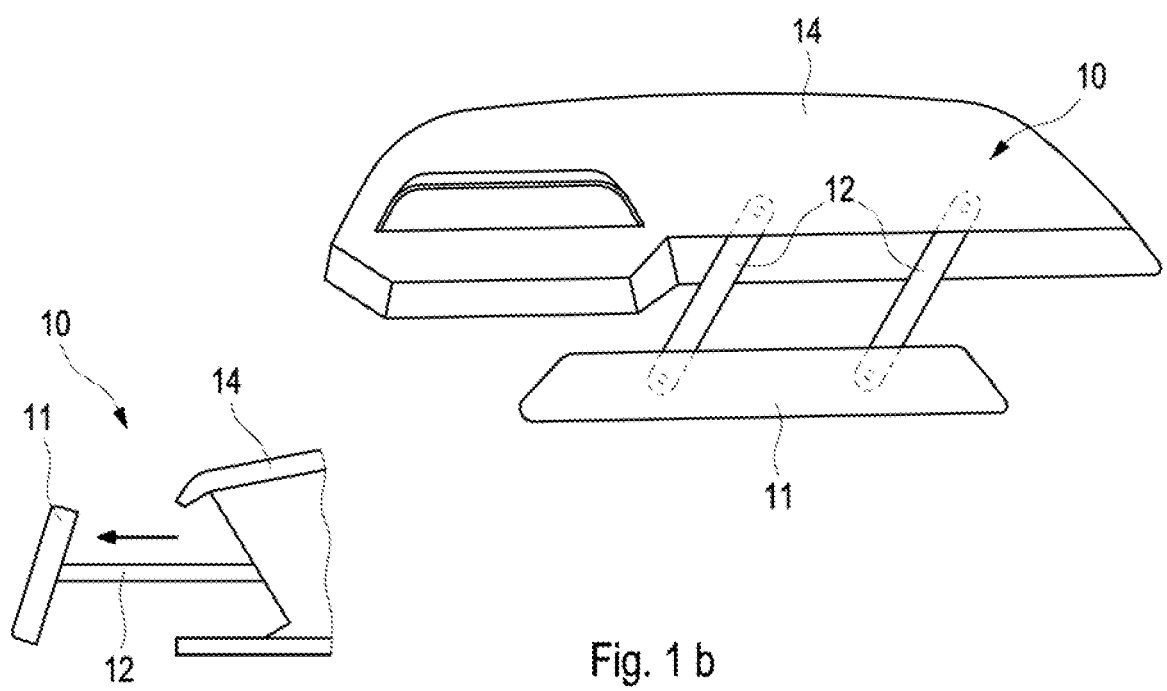
FIG. 1b is a schematic plan view and side view of the example embodiment of the display adjustment system shown in FIG. 1a, in the case of piloted travel.

FIG. 1b shows a schematic plan view and side view of the embodiment, shown in FIG. 1a, of the display adjustment system 10 in the case of piloted travel of the vehicle (not shown). In the case of piloted travel, a steering wheel for controlling the vehicle is not immediately necessary, so that the steering wheel can be for example eliminated, adjusted or folded in, for example already at the changeover from manual travel to piloted travel, as shown in FIG. 1a. The display adjustment system 10 with the adjustment device 12 is configured to adapt the display 11 to the new requirements made of the position of the display 11 which occur as a result of the change of the position of the vehicle occupant during piloted travel. Therefore, the display adjustment system 10 is configured to adjust the display 11 from an original position of the display in the instrument panel 14 into a central position in the passenger compartment of the vehicle by use of the adjustment device 12. In this context, the central position includes at least partially an area in which the steering wheel was previously arranged. The new space, which is acquired by the elimination, the adjustment or the folding-in of the steering wheel, in the region of the instrument panel of the vehicle, permits more central and more easily accessible positioning of the display, since the centrally positioned display can be arranged in the area which was previously required by the steering wheel.

Figure 2:
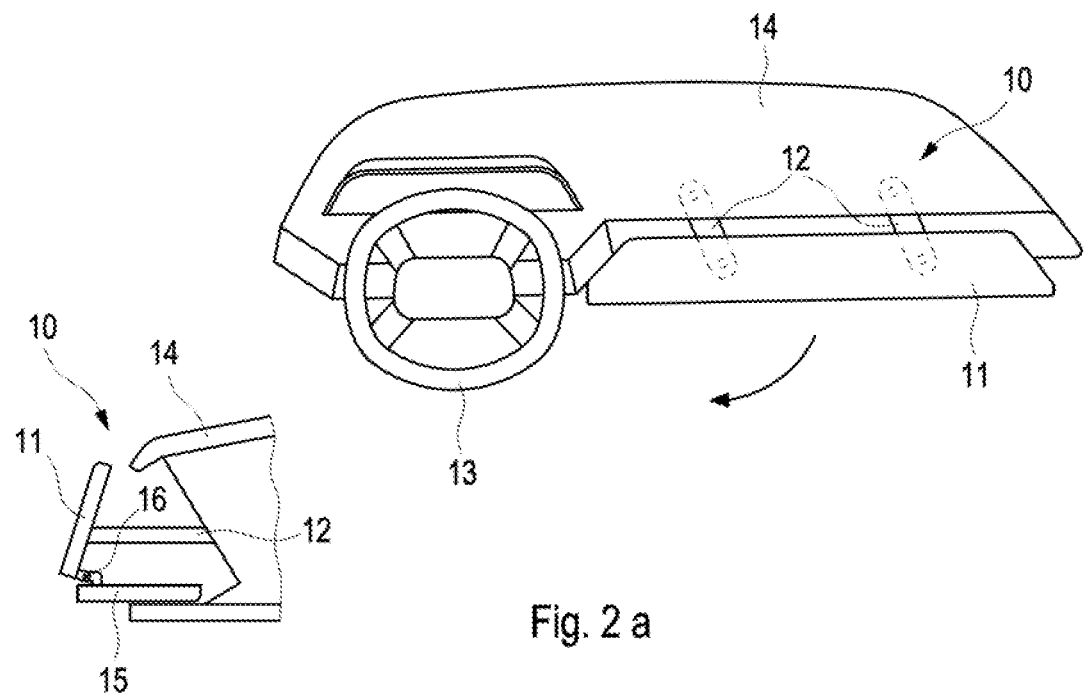
FIG. 2a is a schematic plan view and side view of an example embodiment of the display adjustment system, with an extension/further display area of the display in the case of a changeover from manual travel to piloted travel.
FIG. 2b is a schematic plan view and side view of an extension of the example embodiment of the display adjustment system shown in FIG. 2a, with an extension/further display area of the display in the case of piloted travel.
Figure 2:
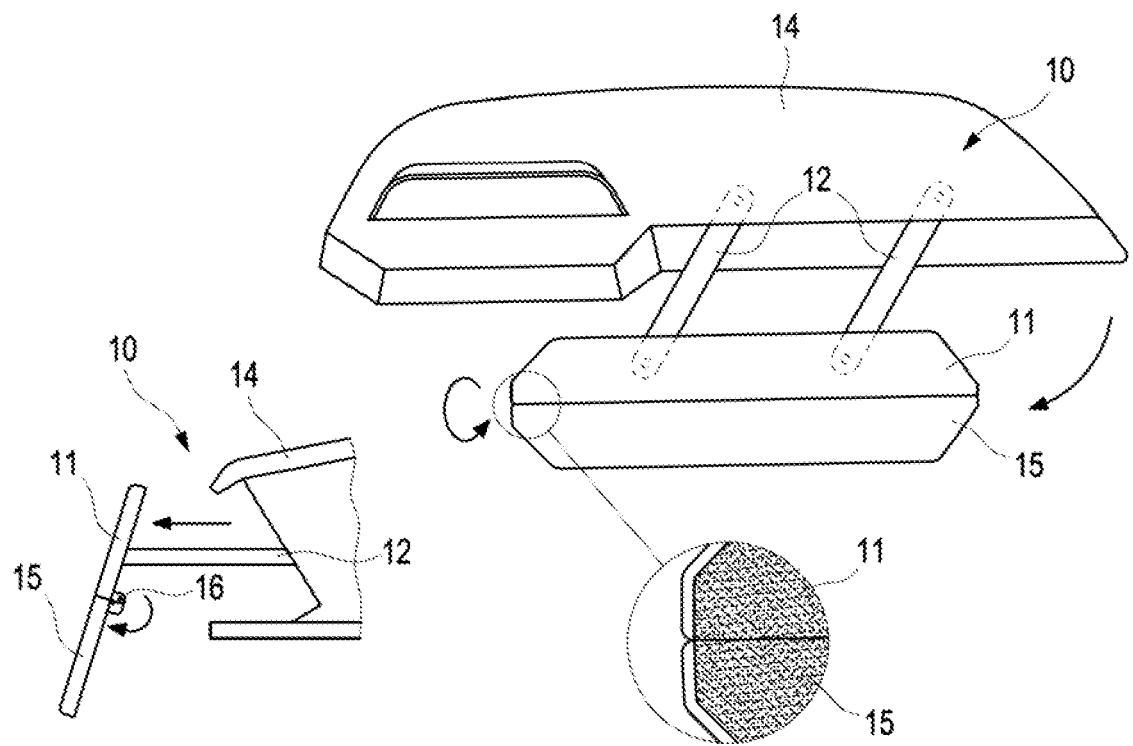

FIG. 2a shows a schematic plan view and side view of a further embodiment of the display adjustment system 10, with an extension of the display in the case of a changeover from manual travel to piloted travel. In this context, a display adjustment system 10, as described in FIG. 1a, is shown, wherein the display 11 of the display adjustment system 10 can be extended. The display 11 can be extended by use of a folding device 16 with an extension or a display area which is for example configured as a display. The display adjustment system 10 is configured to move the display 11 by use of the adjustment device 12 into a more advantageous position for the vehicle occupant, for example the vehicle driver, in the case of a changeover from manual travel to piloted travel. In this context, the adjustment device 12 is configured to adjust the display along the central longitudinal axis of the vehicle and transversely with respect to the central longitudinal axis of the vehicle in the direction of the driver's seat of the vehicle. The steering wheel 13 is for example folded in/adjusted or taken off at the same time as the positioning of the display 11. The adjustment device 12 can be executed manually by a vehicle occupant or vehicle driver. As an example, the vehicle occupant or vehicle driver can also manually fold out the extension or the further display area 15 of the display 11.

FIG. 2b shows a schematic plan view and side view of the embodiment, shown in FIG. 2a, of the display adjustment system 10, with an extension/further display area 15 of the display 11 in the case of piloted travel of the vehicle (not shown). In this context, the display adjustment system 10 is illustrated with the adjustment device 12 and the display 11. In the case of piloted travel, the display adjustment system 10 is configured to position the display 11 for example automatically from the original position in the instrument panel 14 along the central longitudinal axis and transversely with respect to the central longitudinal axis of the vehicle (not shown) to a central position. In this context, the display adjustment system 10 is for example configured, in the case of a changeover from manual travel to piloted travel, to extend the display area of the display 11 automatically or manually by an extension or a further display area 15. As an example, the at least one further display area 15 is attached to the display 11 by use of a folding device 16. The folding device 16 is for example a hinge by use of which the further display area 15 can be folded out. During manual travel, the folding device 16 is typically folded in in such a way that it is arranged for example horizontally at an angle of approximately 90° from a rear side of the display area of the display 11, which rear side points in the direction of the instrument panel 14. In addition, FIG. 2b shows a view of a detail of the arrangement of the further display area 15 at the display area of the display 11 in a folded-out state. A pixel area of the display area of the display 11 directly adjoins a pixel area of the further display area 15 here.

Figure 3:
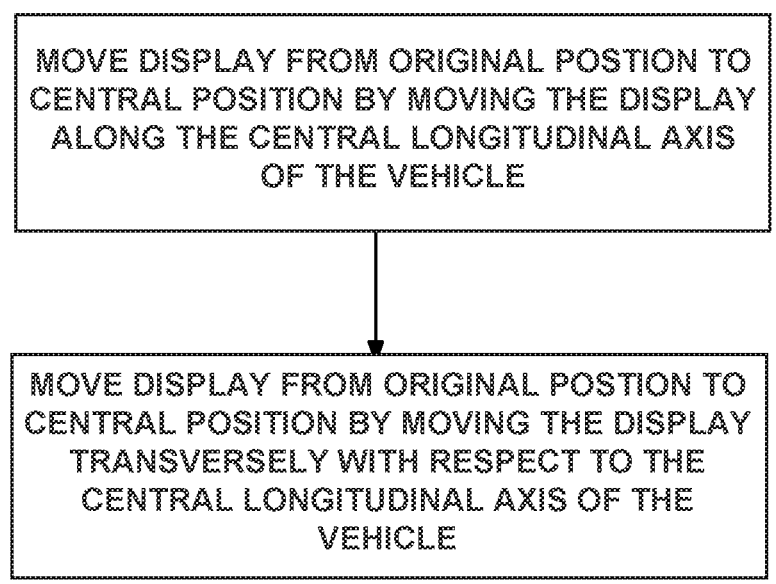
FIG. 3 is a schematic profile of an embodiment of the method described herein for positioning a display in a vehicle including a display adjustment system as described above.

FIG. 3 shows a schematic profile of an embodiment of the method described herein for positioning the display 10 in the vehicle (not shown), including a display adjustment system 10 as described above. In one operation a, the positioning of the display 11 by the adjustment device 12 is carried out starting from the original position of the display 11 in the instrument panel 14 along the central longitudinal axis of the vehicle in the direction of a rear part of the vehicle, and in a further operation b, which is carried out at the same time or subsequently, the positioning of the display 11 by the adjustment device 12 is carried out transversely with respect to the central longitudinal axis of the vehicle in the direction of the driver's seat of the vehicle, and as a result the display 11 is adjusted into the central position in the passenger compartment of the vehicle (not shown). The method described herein can be executed in the case of purely piloted travel or in the case of a changeover from manual travel to piloted travel.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A display adjustment system for an instrument panel in a vehicle, comprising:
   a display having a display area and a foldable display area connected to the display area by a folding device; and
   an adjustment device connecting the display to the instrument panel and operable to adjust the display from an original position in the instrument panel of the vehicle to a central position in a passenger compartment of the vehicle by moving the display in a direction of a longitudinal axis of the vehicle and in a transverse direction with respect to the longitudinal axis of the vehicle,
   the central position being a position formed centrally between front seats of the vehicle and accessible to both a vehicle driver and a front seat passenger of the vehicle,
   when a mode of travel of the vehicle is a piloted driving mode, the adjustment device is adjustable to move the display in the direction of the longitudinal axis of the vehicle to increase a distance of the display from the instrument panel such that a distance between the foldable display area and the instrument panel also increases, and
   when the distance between the foldable display area and the instrument panel increases such that the foldable display area does not contact the instrument panel, the folding device is used to fold open the foldable display area to expand a total display area of the display to use the foldable display area.

2. The display adjustment system according to claim 1, wherein the adjustment system is to automatically adjust the position of the display to the central position, when the piloted driving mode is selected.

3. The display adjustment system according to claim 1, wherein the adjustment system is to automatically adjust the display from the original position in the instrument panel to the central position, when the mode of travel of the vehicle is changed from a manual driving mode to the piloted driving mode.

4. The display adjustment system according to claim 1, wherein the adjustment device includes at least one articulated arm having one end connected to the instrument panel and another end connected to the display.

5. The display adjustment system according to claim 4, wherein the one end is connected to the instrument panel via a rotary joint operable to move the display in the direction of the longitudinal axis of the vehicle and in the transverse direction with respect to the longitudinal axis of the vehicle.

6. The display adjustment system according to claim 1, wherein the folding device includes a hinge about which the foldable display area rotates and operable for the fold open of the foldable display area.

7. The display adjustment system according to claim 6, wherein
   when the mode of travel of the vehicle is a manual driving mode, the foldable display area is in a folded-in position, and
   the folding device is to rotate the foldable display area about the hinge to fold open the foldable display area so that the foldable display area is in a unfolded position and a pixel area of the display area of the display directly adjoins a pixel area of the foldable display area, when the mode of travel of the vehicle is changed from the manual driving mode to the piloted driving mode.

8. The display adjustment system according to claim 7, wherein the foldable display area is disposed horizontally at an angle of about 90° from a rear side of the display area of the display when the foldable display area is in the folded-in position.

9. A method of positioning a display in a vehicle having an instrument panel, the display having a display area and a foldable display area connected to the display area by a folding device, the method comprising:

moving the display, by an adjustment system to operate an adjustment device which connects the display to the instrument panel and operable to adjust a position of the display, from an original position in which the display is provided in the instrument panel to a central position in a passenger compartment of the vehicle by moving the display in a direction of a longitudinal axis of the vehicle toward a rear part of the vehicle, the central position being a position formed centrally between front seats of the vehicle and accessible to both a vehicle driver and a front seat passenger of the vehicle, and from the original position to the central position by moving the display in a transverse direction with respect to the longitudinal axis of the vehicle toward a seat of the vehicle driver;

when a mode of travel of the vehicle is a piloted driving mode, moving the display in the direction of the longitudinal axis of the vehicle increases a distance of the display from the instrument panel such that a distance between the foldable display area and the instrument panel also increases; and when the distance between the foldable display area and the instrument panel increases such that the foldable display area does not contact the instrument panel, triggering the folding device to fold open the foldable display area and expanding a total display area of the display to use the foldable display area.

10. The method according to claim 9, wherein the moving the display from the original position to the central position in the passenger compartment of the vehicle includes automatically moving the display in the direction of the longitudinal axis of the vehicle toward the rear part of the vehicle and moving the display in the transverse direction with respect to the longitudinal axis of the vehicle toward the seat of the vehicle driver, when the mode of travel of the vehicle is changed from a manual driving mode to the piloted driving mode or when the piloted driving mode is selected.

11. The method according to claim 9, further comprising expanding the total display area of the display by folding open the foldable display area so that a pixel area of the display area of the display directly adjoins a pixel area of the foldable display area.

12. The method according to claim 9, further comprising moving the display from the central position in the passenger compartment of the vehicle to the original position in the instrument panel when the piloted driving mode is terminated.

13. A vehicle, comprising:
a passenger compartment including front seats;
an instrument panel; and
a display adjustment system, including:
a display having a display area and a foldable display area connected to the display area by a folding device, and
an adjustment device connecting the display to the instrument panel and operable to adjust the display from an original position in the instrument panel to a central position in the passenger compartment by moving the display in a direction of a longitudinal axis of the vehicle and in a transverse direction with respect to the longitudinal axis of the vehicle, the central position being a position formed centrally between the front seats and accessible to both a vehicle driver and passenger at the front seat of the vehicle, when a mode of travel of the vehicle is a piloted driving mode, the adjustment device is adjustable to move the display in the direction of the longitudinal axis of the vehicle to increase a distance of the display from the instrument panel such that a distance between the foldable display area and the instrument panel also increases, and when the distance between the foldable display area and the instrument panel increases such that the foldable display area does not contact the instrument panel, the folding device is used to fold open the foldable display area to expand a total display area of the display to use the foldable display area.

14. The vehicle according to claim 13, wherein
the adjustment device is to automatically adjust the position of the display to the central position, when the piloted driving mode is selected, and
the adjustment device is to automatically adjust the display from the original position in the instrument panel to the central position, when the mode of travel of the vehicle is changed from a manual driving mode to the piloted driving mode.

15. The vehicle according to claim 13, wherein
the adjustment device includes at least one articulated arm having one end connected to the instrument panel and another end connected to the display, and
the one end is connected to the instrument panel via a rotary joint operable to move the display in the direction of the longitudinal axis of the vehicle and in the transverse direction with respect to the longitudinal axis of the vehicle.

16. The vehicle according to claim 13, wherein
the folding device includes a hinge about which the foldable display area rotates and operable for the fold open of the foldable display area,
when the mode of travel of the vehicle is a manual driving mode, the foldable display area is to be in a folded-in position, and
the folding device is to rotate the foldable display area about the hinge to fold open the foldable display area so that the foldable display area is in a unfolded position and a pixel area of the display area of the display directly adjoins a pixel area of the foldable display area, when the mode of travel of the vehicle is changed from the manual driving mode to the piloted driving mode.

17. The vehicle according to claim 16, wherein the foldable display area is disposed horizontally at an angle of about 90° from a rear side of the display area of the display when the foldable display area is in a folded-in position.

18. The vehicle according to claim 13, further comprising a steering wheel,
wherein
when the mode of travel of the vehicle is a manual driving mode, the steering wheel is in a first position for manual guidance by the vehicle driver, the display is in the original position, and the foldable display area is in a folded-in position, and
when the mode of travel of the vehicle is changed from the manual driving mode to the piloted driving mode, the steering wheel is removable or moved to a second position, the display is moved to the central position, and the foldable display area is folded open.

19. The vehicle according to claim 18, wherein when the display is moved to the central position, the display occupies at least a portion of the space occupied by the steering wheel when the steering wheel was in the first position.

* * * * *